US009672576B2

(12) United States Patent
Bhageria et al.

(10) Patent No.: US 9,672,576 B2
(45) Date of Patent: Jun. 6, 2017

(54) SYSTEM AND METHOD FOR ENABLING EFFECTIVE WORK FORCE MANAGEMENT OF A SMART GRID (75) Inventors: Gopal K. Bhageria, Overland Park, KS (US); Don T. Mak, Reston, VA (US); Kevin M. Monagle, Wellesley, MA (US); Sri Ramanathan, Lutz, FL (US); Jean-Gael F. Reboul, Kenmore, WA (US); Matthew A. Terry, Dunwoody, GA (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 603 days.

(21) Appl. No.: 13/231,787

(22) Filed: Sep. 13, 2011

(65) Prior Publication Data
US 2013/0066481 A1    Mar. 14, 2013

(51) Int. Cl.
*G06F 1/28* (2006.01)
*G06Q 50/06* (2012.01)
*H02J 13/00* (2006.01)
*H04L 29/06* (2006.01)

(52) U.S. Cl.
CPC .......... *G06Q 50/06* (2013.01); *H02J 13/0079* (2013.01); *H04L 63/20* (2013.01); *Y02B 70/3216* (2013.01); *Y02E 60/74* (2013.01); *Y04S 10/30* (2013.01); *Y04S 20/221* (2013.01); *Y04S 40/24* (2013.01)

(58) Field of Classification Search
CPC .. G06F 17/30908; G06F 3/0656; G06F 3/067; G06F 1/28
USPC ........................... 700/297; 709/204; 340/635
See application file for complete search history.

(56) References Cited

U.S. PATENT DOCUMENTS

| 6,963,793 | B2 | 11/2005 | Yamada et al. |
| 7,558,703 | B2 | 7/2009 | Stoupis et al. |
| 7,680,548 | B2 | 3/2010 | Khorramshahi |
| 7,710,950 | B2 | 5/2010 | Buckley et al. |
| 8,045,983 | B2 | 10/2011 | Bantukul |
| 2004/0233598 | A1 | 11/2004 | Yamada et al. |
| 2004/0236620 | A1* | 11/2004 | Chauhan et al. ................. 705/9 |

(Continued)

FOREIGN PATENT DOCUMENTS

| CN | 1536737 | 10/2004 |
| CN | 101425672 | 5/2009 |

(Continued)

OTHER PUBLICATIONS

Mukkamala, Spring 2008 Master of Science Thesis, "Analysis of SIP's Applicability in Smart Grid Environment", Published in Spring 2011 by Jawaharlal Nehru Technological University, India.*

(Continued)

*Primary Examiner* — Tejal Gami
(74) *Attorney, Agent, or Firm* — Christopher McLane; Andrew M. Calderon; Roberts Mlotkowski Safran Cole & Calderon, P.C.

(57) ABSTRACT

A system and a method are provided for enabling effective work force management of a smart grid. The method includes receiving a first Session Initiation Protocol (SIP) message comprising a state of an electrical component on an electrical grid; and notifying a third party of the state of the electrical component by sending a second SIP message.

24 Claims, 5 Drawing Sheets

(56) References Cited

U.S. PATENT DOCUMENTS

| | | | |
|---|---|---|---|
| 2006/0031293 A1 | 2/2006 | Thommes et al. | |
| 2006/0253567 A1* | 11/2006 | Selin et al. | 709/224 |
| 2007/0243870 A1* | 10/2007 | Bantukul | 455/435.1 |
| 2008/0077336 A1 | 3/2008 | Fernandes | |
| 2008/0103732 A1 | 5/2008 | Stoupis et al. | |
| 2008/0177678 A1 | 7/2008 | Di Martini et al. | |
| 2009/0088907 A1 | 4/2009 | Lewis et al. | |
| 2009/0112375 A1 | 4/2009 | Popescu | |
| 2009/0129376 A1 | 5/2009 | Johnson | |
| 2009/0240449 A1 | 9/2009 | Gibala et al. | |
| 2009/0317087 A1* | 12/2009 | Bernard et al. | 398/135 |
| 2010/0077069 A1 | 3/2010 | Kim | |
| 2010/0100250 A1 | 4/2010 | Budhraja et al. | |
| 2010/0131329 A1 | 5/2010 | An et al. | |
| 2010/0134117 A1 | 6/2010 | Dzafic | |
| 2010/0150122 A1 | 6/2010 | Berger et al. | |
| 2010/0152910 A1 | 6/2010 | Taft | |
| 2010/0157980 A1 | 6/2010 | Ellsworth et al. | |
| 2010/0161815 A1 | 6/2010 | Pettissalo | |
| 2010/0217449 A1* | 8/2010 | Musti et al. | 700/291 |
| 2011/0066297 A1* | 3/2011 | Saberi et al. | 700/287 |
| 2011/0071693 A1 | 3/2011 | Sun et al. | |
| 2012/0031581 A1 | 2/2012 | Chillar et al. | |

FOREIGN PATENT DOCUMENTS

| | | |
|---|---|---|
| CN | 101491042 | 7/2009 |
| EP | 2156978 | 2/2010 |
| EP | 1046244 B1 * | 12/2010 |
| WO | 2008054664 | 5/2008 |

OTHER PUBLICATIONS

Final Office Action dated Mar. 31, 2014 for U.S. Appl. No. 13/231,780; 14 Pages.

Notice of Allowance dated Jun. 19, 2014 for U.S. Appl. No. 13/231,780; 10 Pages.

Siemens Enterprise Communications, "SIP-Open Communications for Smart Grid Devices", Jun. 2009, 24 pages.

David J. Leeds, "The Smart Grid in 2010: Market Segments, Applications and Industry Players", GTM Research, Jul. 2009, 145 pages.

International Search Report and Written Opinion dated Oct. 4, 2012 in PCT Application No. PCT/CN20112/077225; 10 pages.

Diadamo, "SIP: The Clear Choice for Smart Grid Communications", SmartGridNews.com, Jun. 23, 2009; 3 Pages, http://www.smartgridnews.com/artman/publish/commentary/SIP_The_Clear_Choice_for_Smart_Grid_Communications-604.html.

Office Action dated Oct. 29, 2013 in U.S. Appl. No. 13/231,780; 12 pages.

Cisco, "Cisco Unified Operations Manager 2.0", http://www.cisco.com/c/en/us/products/collateral/cloud-systems-manag/index.html, accessed Jun. 19, 2015, 10 pages.

Indigo Software, "Indigo Presence Server & SDK", http://www.indigosw.com/pdf/presence_server.pdf, accessed Jun. 19, 2015, 4 pages.

Electric Power Research Institute, "IntelliGrid", http://intelligrid.epri.com/, Jan. 28, 2011, 2 pages.

Wikipedia, "Presence service", http://en.wikipedia.org/wiki/Presence_service, Feb. 28, 2011, 1 page.

Office Action dated Dec. 27, 2016 in related U.S. Appl. No. 14/517,090, 16 pages.

* cited by examiner

SYSTEM AND METHOD FOR ENABLING EFFECTIVE WORK FORCE MANAGEMENT OF A SMART GRID

TECHNICAL FIELD

The present invention generally relates to a smart grid, and more particularly, to a system and a method for enabling effective work force management of a smart grid.

BACKGROUND

An electrical grid is an interconnected network for delivering electricity from suppliers to consumers. More specifically, the electrical grid is a vast, interconnected network of transmission lines, starting from a supplier of electricity to a consumer of the electricity. The consumer may be, for example, a personal consumer or an industrial consumer.

It has become increasingly important to manage the electrical grid, in order to more efficiently distribute electricity in an environmentally friendly manner. For example, the electrical grid has started to be connected to lower or zero emission sources such as, for example, windmills, hydropower plants and solar, all which provide less emissions than conventional facilities. In another example, electricity suppliers are providing discounted fees for off-peak electricity consumption, e.g., providing cost incentives to consumers for those using their appliances during the off-peak times.

Also, it has become more vital to manage the electrical grid to distribute electricity in a safe manner. Electricity suppliers must often monitor their electrical grids for downed power lines and electrical faults to prevent such problems from physically harming consumers and causing further electrical problems. To monitor the electrical grid, the suppliers deploy field crews to locations where there may be problems with the electrical grid, to analyze situations at the locations, take manual measurements of electrical devices at the locations, and if necessary, reconfigure, repair or replace the electrical devices to resolve the problems.

However, the field crews deployed to work locations may encounter various challenges at the locations. For example, an electrical device may be damaged which can pose a safety issue to field crews. In addition, some of the problems involving the electric grid may be difficult to detect without accurate measurements of electric devices and/or without the expertise of a field crew with a more specialized skill set.

SUMMARY

In a first aspect of the invention, a method includes receiving a first Session Initiation Protocol (SIP) message including a state of an electrical component on an electrical grid; and notifying a third party of the state of the electrical component by sending a second SIP message.

In another aspect of the invention, a system is implemented in hardware which includes a domain server operable to: receive a Session Initiation Protocol (SIP) notify message including a monitored state of at least one electrical component on an electrical grid, from the at least one electrical component; send a SIP publish message including the monitored state of the at least one electrical component, to at least one client device of a field crew for management of the at least one electrical component; determine a control command including at least one action to take in response to the monitored state of the at least one electrical component; and send the control command to the at least one electrical component. The at least one electrical component configures itself based on the control command by performing the at least one action to take in response to the monitored state.

In an additional aspect of the invention, a computer program product includes a computer usable storage medium having readable program code embodied in the storage medium. The computer program product includes at least one component operable to: receive a first Session Initiation Protocol (SIP) message including a state of an electrical component on an electrical grid; and notify a third party of the state of the electrical component by sending a second SIP message.

In a further aspect of the invention, a method for work force management on an electrical grid, including providing a computer infrastructure, being operable to: send a register message to register in a network; record an electrical event at a location on the electrical grid specified by a field crew; send a notify message including presence information of the electrical event at the location specified by the field crew, to a presence server; receive a control command including at least one action to take in response to the electrical event; and perform the at least one action to take in response to the electrical event.

In another aspect of the invention, a computer system for work force management on an electrical grid includes a CPU, a computer readable memory and a computer readable storage media. First program instructions receive a Session Initiation Protocol (SIP) notify message including a monitored state of at least one electrical component on the electrical grid, from the at least one electrical component. Second program instructions send a SIP publish message including the monitored state of the at least one electrical component, to at least one client device of a field crew for management of the at least one electrical component. Third program instructions to determine a control command including at least one action to take in response to the monitored state of the at least one electrical component. Fourth program instructions to send the control command to the at least one electrical component. Fifth program instructions to receive a SIP subscribe message requesting to subscribe to updates of the monitored state of the at least one electrical component, from the at least one client device of the field crew. The monitored state of the at least one electrical component includes an indication whether the at least one electrical component is on or off, an indication that the at least one electrical component is malfunctioning or is inoperable, an indication that the at least one electrical component requires maintenance, and an indication that the at least one electrical component is performing within specified operational limits. The first, second, third, fourth, and fifth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to a smart grid, and more particularly, to systems and methods for enabling effective work force management of a smart grid, e.g., electrical grid. In embodiments, the present invention provides communication and monitoring capability of the smart grid (e.g., electrical grid) to more effectively manage the electrical grid as it becomes ever more complex to manage. For example, to manage the many different demands on the electrical grid and to ensure that the electrical grid is working most efficiently, the present invention provides an Internet Protocol (IP) backplane with the traditional electrical grid so to allow efficient communication between the utility and field crews.

More specifically, the present invention provides Session Initiation Protocol (SIP) as a low-latency, scalable communication protocol used by the smart grid, particularly, between the electrical device and the electricity supplier or utility. The SIP communication can also be provided between the electrical device and a member of a field crew, or between the utility and the field crew. Further, the present invention provides a presence server in a utility domain or in a telecommunications domain. The presence server allows authorized entities, such as the utility, a network service provider, and a field crew, to subscribe to the electrical device's status information recorded at the electrical device so as to then be able to interact with the smart grid. This can provide location information, as well as other pertinent information, to those individuals that are servicing and/or monitoring the smart grid. This allows the supplier of electricity (e.g., utility or other service provider) to manage and monitor the electrical grid and thereby more efficiently and effectively deploy its field crew. For example, by receiving information directly from the electrical grid, it is now possible to deploy members of a field crew more efficiently to service outages, downed lines or other issues presented on the electrical grid. For instance, the supplier of electricity (e.g., service provider) can now monitor the electrical grid using an IP backplane in order to effectively deploy and manage its workforce to, for example, reload or rework voltage issues on the smart grid. This can include, for example, upgrading, fixing or maintaining electrical devices (e.g., a fuse and/or a transformer) on the electrical grid.

In more specific embodiments, the IP backplane can notify a dispatcher at the supplier's control center that an issue exists on the electrical grid. This information can be granular to the extent and location of any issue. In turn, the dispatcher may issue a switching plan document (e.g., work order, schematics, safety documents or other instructions) to the field crew that instructs particular member(s) of the work force to attend to an electrical device (e.g., a fuse and/or a transformer) on the electrical grid. The switching plan may include, for example, a safety document that informs the pertinent individuals of the field crew of particular safety issues. For example, the safety document may include whether the particular device is cleared to perform steps described in the switching plan document.

In embodiments, due to, for example, limited telemetered measurements of the electrical device, it may not be possible to verify that the electrical device field crew is currently active, e.g., live electricity. In this case, the issued safety document can, for example, specify that the field crew take all necessary actions to ensure its safety, for example, by manually measuring the voltage and a current at the electrical device and if need be, opening a fuse or a circuit breaker to isolate the device.

Advantageously, the present invention provides the field crew and the utility additional information (e.g., the voltage and/or the current) of the electrical device via remote, on-demand notifications from the electrical device, without requiring the field crew to perform unsafe manual measurements. In addition, the present invention gives more remote control of the electrical device to the field crew and the utility to prevent potential accidents while manually operating the electrical device. The present invention allows the field crew and the utility to get a more accurate, more real-time picture of electrical patterns across the smart grid. By utilizing telecommunications technology and the Mobile Web, the smart grid is fully-integrated with and connected to the Internet and can be managed to a more granular level.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
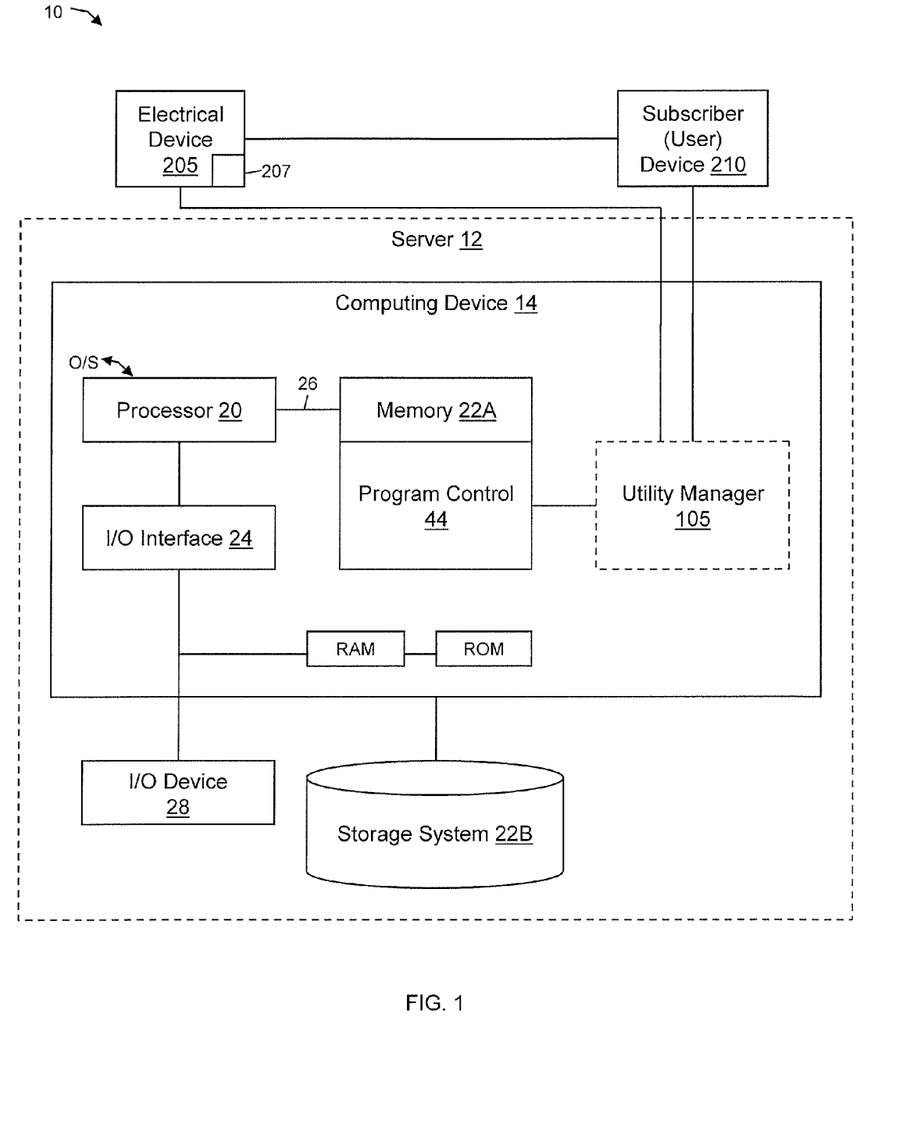
FIG. 1 shows an illustrative environment of a server and/or a computing device for implementing steps in accordance with aspects of the invention.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a utility manager 105, e.g., the processes described herein. The utility manager 105 communicates with one or more electrical devices 205 (on an electrical grid) and one or more subscribers 210. The communication between the utility manager 105, the one or more electrical devices 205 and the one or more subscribers 210 can be through, for example, Session Initiation Protocol (SIP) messaging using, for example, instant messaging or other communications using SIP.

As should be understood by those of skill in the art, SIP is a signaling protocol widely used for controlling multimedia communication sessions such as voice and video calls over Internet Protocol (IP). The SIP protocol can be used for creating, modifying and terminating two-party (unicast) or multiparty (multicast) sessions consisting of one or several media streams. In embodiments, the present invention implements SIP as video conferencing, streaming multimedia distribution, instant messaging, presence information and file transfer applications. In embodiments, the SIP can be implemented as a text-based protocol, incorporating many elements of the Hypertext Transfer Protocol (HTTP) and the Simple Mail Transfer Protocol (SMTP). Also, as used in the present invention, the SIP protocol is an Application Layer protocol designed to be independent of the underlying transport layer, and as such can run on Transmission Control Protocol (TCP), User Datagram Protocol (UDP), or Stream Control Transmission Protocol (SCTP).

The utility manager 105 can be implemented as one or more program code in the program control 44 stored in memory 22A as separate or combined modules. Additionally, the utility manager 105 may be implemented as separate dedicated processors or a single or several processors to provide the function of this tool. Moreover, it should be understood by those of ordinary skill in the art that the utility manager 105 is used as a general descriptive term for providing the features and/or functions of the present invention, and that the utility manager 105 may comprise many different components such as, for example, the components and/or infrastructure described and shown with reference to FIG. 2.

In embodiments, the electrical device 205 may be any device involved in the generation, transmission, and/or distribution of electricity on an electrical grid such as, for example, fuses, transformers, circuit breakers, capacitors, voltage regulators, compensators, relays, feeders, switches, protection devices, gateways (e.g., a router), and/or any other electrical grid infrastructure devices, for example. The electrical device 205 may be located at, for instance, an electrical substation, a power station, or anywhere in the transmission line, in the smart grid. Further, the electrical device 205 may be located within various types of smart grids, e.g., a low-voltage (up to 60 kilovolts (kV)) grid, a high-voltage (110 kV and up) grid, and/or an extra high-voltage (265 kV and up, AC and high-voltage DC (HVDC)) grid. The one or more subscribers 210 can be a dispatcher at a utility company or a third party service provider, for example.

In embodiments, the electrical device(s) 205 includes a monitoring device 207. The monitoring device 207 can be any type of electrical monitoring device such as, for example, a voltage meter, current meter, etc., with the capability of transmitting the monitored information to the utility manager 105, e.g., via SIP. In embodiments, the monitoring device 207 transmits the monitored information to the utility manager 105 and/or the one or more subscribers 210. In embodiments, the monitoring device 207 can also transmit presence information to the utility manager 105 and/or the one or more subscribers 210. In embodiments, the presence information (presence state) is provided by a network connection to a presence service, which can be, for example, depicted as the utility manager 105 (or other third party device). In embodiments, the presence information can include the status of the device(s) 205, the type of the device(s) 205 and its specifications. In further embodiments, the location of the particular device(s) 205 can also be provided, for example, using presence information or through a look up table in the computing device 14. As to the latter scenario, once presence information is received at the computing device 14, this information can be matched in a look-up table with pertinent location information for the electrical device(s) 205.

In embodiments, the subscriber (user) device 210 (e.g., a smartphone, a personal computer (PC), and/or a laptop, etc.) is in communication with the utility manager 105 and/or the electrical device(s) 205. For example, in embodiments, the subscriber device 210 may be used by a field crew and/or the dispatcher of a service provider and/or supplier of electricity at a utility control center.

In implementation, the subscriber device 210 can send and receive messages to and from the utility manager 105 in order to manage the electrical device(s) 205. For example, through SIP messaging, the subscriber device 210 may subscribe to and receive status information from the electrical device(s) 205, to interact with and detect an electrical fault of the electrical device 205. This electrical fault information can be received by the subscriber device 210 and/or the utility manager 105. The subscriber device 210 can also send a request to the utility manager 105 for the status information of the electrical device 205, and may send a control command via the utility manager 105 to the electrical device 205, which uses the control command to change its configuration, e.g., turn itself on or off and/or decrease its voltage output. Also, through the use of rules, stored in the storage system 22B for example, the utility manager 105 can send the control command to the electrical device 205. The rules indicate what constitute critical events at the electrical device 205 and how to manage the electrical device 205 upon the occurrence of the events. Accordingly, management of the electrical device 205 may be accomplished via the utility manager 105 and/or the subscriber device 210 of the field crew.

In operation, for example, a field crew can receive a switching plan document and a safety document pertaining to the electrical device 205, from a utility. In embodiments, the switching plan can include specifications, a location, and a schematic of the electrical device 205. The field crew may be deployed to site of the electrical device 205 and subscribe to status information of the electrical device 205 via the SIP-enabled subscriber device 210 and the utility manager 105. The field crew can send a request to the electrical device 205 for its status information via the utility manager 105. The electrical device 205 may receive the request and provide the status information via SIP messages to the utility manager 105, which provide the status information to the subscriber device 210.

Advantageously, the field crew can obtain the necessary status information of the electrical device 205 to, for example, start ensuring the work force's safety, de-energize the electrical device 205, operate manual circuit breakers, etc. In addition, the field crew can obtain such status information of the electrical device 205 automatically, remotely, and safely, e.g., without having to approach the possibly dangerous electrical device 205. Further, the dispatcher of the utility provider can receive the status information of the electrical device 205 to determine whether another field crew (e.g., with a more-specialized skill set) should be sent to reconfigure the electrical device 205 based on a look-up table including various, different field crews, such as deploying a specialized crew in order to fix a fuse, etc.

While executing the computer program code, the processor 20 can read and/or write data to/from memory 22A, storage system 22B, and/or I/O interface 24. The program code executes the processes of the invention, for example, functions of a presence server, e.g., managing the electrical device 205 of the smart grid. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
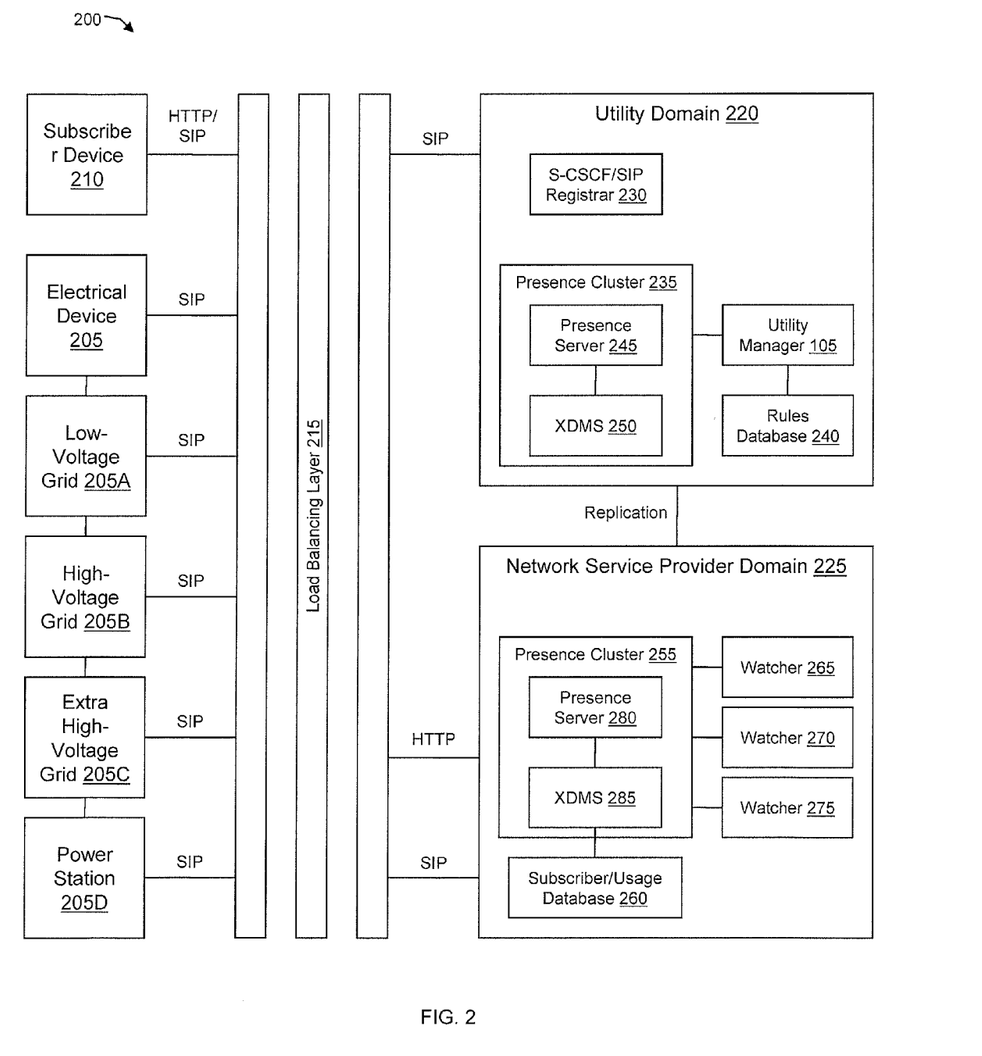
FIG. 2 shows an illustrative environment for implementing the steps in accordance with aspects of the invention.

FIG. 2 shows an illustrative environment 200 for implementing the steps in accordance with aspects of the invention. The environment 200 includes the electrical device 205, the subscriber device 210, a load balancing layer 215, a utility domain 220, and a network service provider domain 225. In embodiments, the electrical device 205 and the subscriber device 210 may include the electrical device 205 and the subscriber device 210 in FIG. 1. The electrical device 205 may include a device involved in the generation, transmission, and distribution of electricity, such as a fuse, a transformer, a circuit breaker, a capacitor, a voltage regulator, a reactor, a compensator, a relay, a feeder, a switch, a protection device, a gateway (e.g., a router), and/or any other electrical grid infrastructure device, for example. The electrical device 205 may be located at, for instance, an electrical substation, a power station, and/or anywhere along the transmission line in the smart grid. The electrical device 205 includes a lightweight SIP client and a radio antenna connected to the SIP client, allowing the electrical device 205 to communicate in SIP with other entities that can also communicate in SIP, such as the subscriber device 210, and the domains 220, 225.

In embodiments, the environment 200 may further include various types of grids within the overall smart grid, e.g., a low-voltage grid 205A, a high-voltage grid 205B, and/or an extra high-voltage grid 205C. The environment 200 may further include a power station 205D within the smart grid. The electrical device 205, the grids 205A, 205B, 205C, and the power station 205D may be electrically connected to each other, and may generate, transmit, and distribute electricity between each other. The grids 205A, 205B, 205C and the power station 205D may include a SIP client or gateway within their location areas and a radio antenna connected to the SIP client or gateway, allowing the grids 205A, 205B, 205C and the power station 205D to communicate in SIP with other entities through SIP protocol.

In embodiments, the subscriber device 210 may be any device that interfaces with a subscriber or the field crew, e.g., a smartphone, a personal computer (PC), and/or a laptop. Like the electrical device 205, the subscriber device 210 also includes a lightweight SIP client and a radio antenna connected to the SIP client, which allow the subscriber device 210 to communicate in SIP with other SIP based entities. In embodiments, the subscriber device 210 may also include a web client that allows the subscriber device 210 to communicate in Hypertext Transfer Protocol (HTTP) with other entities that can also communicate in HTTP, such as the network service provider domain 225.

The electrical device 205 and the subscriber device 210 communicate with the domains 220, 225 via the load balancing layer 215 that may distribute data (e.g., a load) evenly between the above entities. For example, the load balancing layer 215 may be provided in a network switch and a gateway router, which may be implemented in the computing device 14 of FIG. 1. The load balancing layer 215 includes a SIP client and a web client such that the load balancing layer 215 is able to communicate in SIP and HTTP with other SIP-enabled and/or HTTP-enabled entities.

The utility domain 220 is a network domain of an electricity supplier or utility provider (or other service provider). In embodiments, the utility domain 220 may include a Serving Call Session Control Function (S-CSCF)/SIP registrar 230, a presence cluster 235, the utility manager 105, and a rules database 240. The S-CSCF/SIP registrar 230 is a SIP server that controls SIP sessions between the electrical device 205, the subscriber device 210, and the domains 220, 225. In particular, the S-CSCF/SIP registrar 230 handles SIP registrations of the electrical device 205 and the subscriber device 210. So, over and above a Mobile Subscriber Integrated Services Digital Network Number (MSISDN) of these entities, they are registered as IP Multimedia Subsystem (IMS)/SIP clients in the domains 220, 225. In embodiments, the S-CSCF/SIP registrar 230 may be implemented in the server 12 and/or the computing device 14 in FIG. 1, and may be alternatively located in the network service provider domain 225 and/or a third-party location. After registration, the S-CSCF/SIP registrar 230 forwards SIP messages from the electrical device 205 and the subscriber device 210 to components in the domains 220, 225, such as the presence cluster 235.

The presence cluster 235 includes a presence server 245 and an Extensible Markup Language (XML) Data Management Server (XDMS) 250. The presence server 245 is a SIP application server that communicates and stores presence information of client devices, such as the electrical device 205 and the subscriber device 210. The presence server 245 may be implemented in the server 12 of FIG. 1 and, for example, in the utility manager 105. Specifically, the presence server 245 receives SIP notify messages including the presence information from the client devices. In the case of the smart grid, the presence information may include, for example, the status information of the electrical device 205 that indicates a voltage, current, and/or power, generated or transmitted by the electrical device 205. In embodiments, the status information of the electrical device 205 may also, for instance, (i) indicate a spike in voltage generated or transmitted by the electrical device 205,
(ii) indicate whether the device 205 is on or off,
(iii) indicate that the device 205 includes a blown fuse,
(iv) include a maintenance signal,
(v) indicate that the device 205 is overheating, and/or
(vi) indicate a humidity in or around the device 205.

With this received presence information, the presence server 245 sends the presence information to the XDMS 250 that builds or updates a presence document including the presence information. In embodiments, this presence document may include the presence information of all electrical devices and subscriber devices within a specified area of the smart grid. The presence document may include multiple nodes, or in other words, the presence document may refer to multiple areas in the smart grid and their associated client devices. In embodiments, the presence document and the SIP messages may be in a XML format, a Rich Presence Information Data (RPID) format, and/or a Presence Information Data Format (PDIF). The XDMS 250 may be implemented in the server 12 of FIG. 1.

Additionally, the presence server 245 receives SIP subscribe messages from the client devices, for example, the subscriber device 210 and the utility manager 105. The SIP subscribe messages are requests to receive (e.g., to subscribe to) updates about the presence information from the presence server 245. The presence server 245 manages these SIP subscribe messages from the client devices and when there is an update about the presence information, the presence server 245 automatically sends SIP publish messages quickly and effectively to the subscribing client devices (e.g., the subscriber device 210 and the utility manager 105) that include the presence information. The presence server 245 may send information regarding the subscribing client devices ("subscriber presence information") to the XDMS 250, which may then update the corresponding presence document to include such subscriber presence information. As a result, the presence document may include information regarding relationships between electrical devices and subscribing client devices interested in receiving updated presence information with respect to these electrical devices. That is, the presence document can associate each of its nodes to the subscriber, enabling enhanced utility data tracking with tight association to the specific subscriber or the field crew that may be responsible for reconfiguring one or more electrical devices.

The presence information and other pertinent information can be provided to the field crew via SIP messaging. By quickly updating the field crew with the presence information of the electrical device 205 via a SIP channel, the field crew can rapidly react to any notification in a temporally and channel-appropriate manner. For instance, the field crew can react to a notification "out-of-band," e.g., manually configure the electrical device 205 if the notification indicates that the electrical device 205 is safe to work with. In another example, the field crew can react to a notification "in-band," e.g., remotely send the control command (e.g., a SIP message) via a smartphone and the utility domain 220 to the electrical device 205 to turn off the device 205, ensuring the field crew's safety while working with the device 205. In embodiments, the control command may include instructions for the electrical device 205 to change its configuration in various ways, such as to be re-energized or de-energized, to increase or decrease a voltage generated by the device 205, and/or to send the maintenance signal to the utility, for example. In addition, the presence cluster 235 (specifically, the XDMS 250) may update the presence document pertaining to the electrical device 205 to include information regarding the control command sent to the device 205.

The rules database 240 includes and stores rules set by the subscriber or the field crew regarding control of the electrical device 205. For example, the rules may indicate that the subscriber has allowed the utility provider (e.g., the utility manager 105) to control the electrical device 205, has programmed to control the electrical device 205 for only a specific period of time, or has programmed the electrical device 205 to be in his or her complete control. The rules may also indicate what constitute critical events at the electrical device 205 that require control of the device 205 and thus, include event lists and event categories. For example, these critical events may include the electrical device 205 generating or transmitting power over or under a predetermined threshold, the device 205 being on or off, the device 205 including a blown fuse or a maintenance signal, the device 205 overheating, etc. The control of the electrical device 205 may be accomplished via the utility manager 105 sending or forwarding the control command to the electrical device 205 determined from the rules database 240. The control command may include a rule indicating to the electrical device 205 which actions to take in response to a critical event at the electrical device 205. In embodiments, the rules database 240 may be set by the subscriber via the subscriber device 210.

The network service provider domain 225 is a network domain of an Internet service provider and/or a cellular service provider. In embodiments, the network service provider domain 225 may include a presence cluster 255, a subscriber/usage database 260, and watchers 265, 270, 275. The presence cluster 255 includes a presence server 280 and a XDMS 285, which perform functions similar to those of the presence server 245 and the XDMS 250 in the utility domain 220. In fact, all information (e.g., the presence information and the subscriber presence information) received and processed in the presence server 245 and the XDMS 250 in the utility domain 220 may be transferred to or replicated in the presence server 280 and the XDMS 285 in the network service provider domain 225, and vice versa. In embodiments, replication in the domains 220, 225 may be accomplished via peering and dedicated bandwidth between the domains 220, 225. In embodiments, the presence servers 245, 280 may be in a hierarchal relationship, for instance, where the presence server 245 is a primary, master server and the presence server 280 is a secondary, slave server.

The subscriber/usage database 260 receives the built or replicated presence documents from the XDMS 285 and stores the presence documents for the system. The watchers 265, 270, 275 are entities in the network service provider domain 225 that send SIP subscribe messages to the presence cluster 255 to subscribe to updates regarding the presence information in the presence server 280, e.g., the SIP publish messages. For example, one of the watchers 265, 270, 275 may represent the utility provider (e.g., the dispatcher at the utility control center), and may be implemented in the computing device 14 in FIG. 1.

By subscribing to the SIP publish messages, the watchers 265, 270, 275 are able to watch for notifications of the critical events at and the status information of the electrical device 205. In addition, the watchers 265, 270, 275 are able to react to these notifications as necessary. For instance, if the watcher 265 represents the utility provider and observes a notification of an electrical fault at the electrical device 205, the watcher 265 may cut electricity to the electrical device 205 (possibly via the control command to the device 205), to keep the field crew at the device 205 safe from accidents. This provides a decentralized approach (e.g., involving many potential actors or watchers) to acquiring status information of electrical devices and controlling the electrical devices.

In embodiments, presence infrastructure (e.g., the presence cluster 255) may be only present in the network service provider domain 225, and a watcher (e.g., the utility manager 105) may be only present in the utility domain 220. In other words, the utility manager 105 may correspond to a watcher. In this embodiment, the utility manager 105 may subscribe to all presence information updates or events and reacts as necessary. To transfer information, the domains 220, 225 may include dedicated bandwidth between the two sides. In embodiments, the presence infrastructure may include multiple presence clusters for different types of devices, such as subscriber devices, electrical devices, and watchers.

In embodiments, a third-party watcher may be hosted in a third-party environment, which is completely configurable by a subscriber. Specifically, the subscriber may configure how the environment infrastructure could react to notifications of the critical events or status information of the electrical device 205 or the subscriber device 210 as necessary. For example, the infrastructure could react differently to a subscriber device notification from a meters field crew or a maintenance field crew, providing the crews only information necessary to successfully and safely complete their work orders and withholding unnecessary information. The infrastructure may be implemented in the server 12 and/or the computing device 14 in FIG. 1.

In embodiments, several pairs of presence clusters (e.g., the presence cluster 255) may be deployed in front-end electrical premises of the utility, e.g., a distribution substation, a sub-transmission substation, a transmission substation, a generating plant, etc. The field crew can subscribe to these presence clusters and become a temporally-authorized watcher for these presence clusters. This allows the field crew to subscribe to status information of electrical devices at the electrical premises, and to safely send a control command directly to any one of the electrical devices.

In operation, for example, a field crew can receive a switching plan document and/or a safety document pertaining to an electrical device in a smart grid, from a utility via a SIP channel. With the present invention, the field crew may arrive on site of the electrical device and subscribe to status information of the electrical device via a SIP-enabled subscriber device and presence clusters on site. The field crew can send a request to the electrical device for its status information via the presence clusters. The electrical device may receive the request and determine the status information via a monitoring device, such as the monitoring device 207 in FIG. 1. The electrical device may provide the status information via SIP messages to the presence clusters, which provide the status information to the subscriber device. Advantageously, the field crew can obtain the necessary status information of the electrical device to, for example, start ensuring the work force's safety, de-energize the electrical device, operate manual circuit breakers, etc. In addition, the field crew can obtain such status information of the electrical device automatically, remotely, and safely, e.g., without having to approach the possibly dangerous electrical device. Further, the dispatcher of the utility provider can receive the status information of the electrical device and deploy another, more-specialized field crew (e.g., a meters field crew) to reconfigure the electrical device based on the received status information.

In another example, due to lack of telemetered measurements of the electrical device, a dispatcher at a control center of the utility can publish the safety document to the field crew without fully clearing the work force to perform work at the electrical device. With the present invention, the field crew may arrive on site of the electrical device and due to weather conditions or any other reason, cannot directly access the electrical device. The field crew can subscribe to the status information of the electrical device via the subscriber device and the presence clusters on site, and/or can request the electrical device to detect the status information via its monitoring device and provide the status information via the presence clusters. Either way, the field crew may receive the necessary status information of the electrical device to ensure the work force's safety and to perform the required operations.

In another operational mode, for example, the field crew can receive the switching plan document and the safety document from the utility, arrive on site of the electrical device, and subscribe to the status information of the electrical device via the subscriber device and the local presence clusters, with the present invention. The field crew may also send the request to the electrical device for its status information via the subscriber device and the presence clusters. In response, the electrical device can send the current status information to the subscriber device via the presence clusters. Due to weather conditions or any other reason, the field crew may not be able to directly or manually access the electrical device to reconfigure such device. The present invention allows the field crew to send a control command to the electrical device via the subscriber device and the presence clusters. The electrical device can receive the control command, and in response, change its configuration based on the control command, and send an acknowledgment message to the subscriber device. Advantageously, the present invention allows the field crew to not only better reconfigure the electrical device manually but also more safely and automatically reconfigure the electrical device remotely. In other words, the present invention provides the field crew, and the utility, the ability to remotely manage and control the electrical device.

In another example, the present invention allows a specific area of a smart grid to have a presence status. Specifically, the presence status of the grid area can include a status indicating that the grid area is "intentionally off-line." With the present invention, the utility may remotely configure the grid area to be "intentionally off-line" when the field crew is performing maintenance that requires the area to be de-energized, such as when the field crew is reconfiguring an electrical device in the grid area. When another user or field crew is installing, for example, solar panels or another home power generating system in the grid area, this user can communicate with a presence cluster in the grid area to ensure that it is in a status that allows the connection of the new power generating system. In the case where the grid area is set to be "intentionally off-line," the user may be prevented from installing the new power generating system in the grid area until such a presence status is removed.

Figure 3:
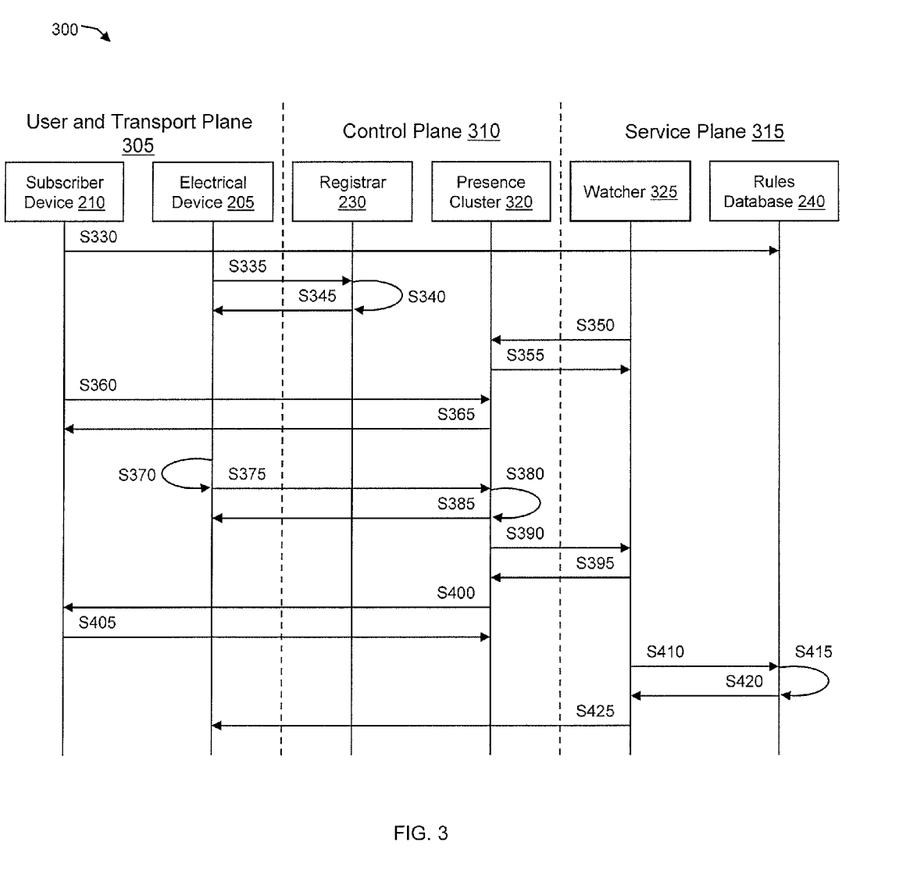
FIG. 3 shows an exemplary flow for enabling work force management of a smart grid in accordance with aspects of the invention.
Figure 4:
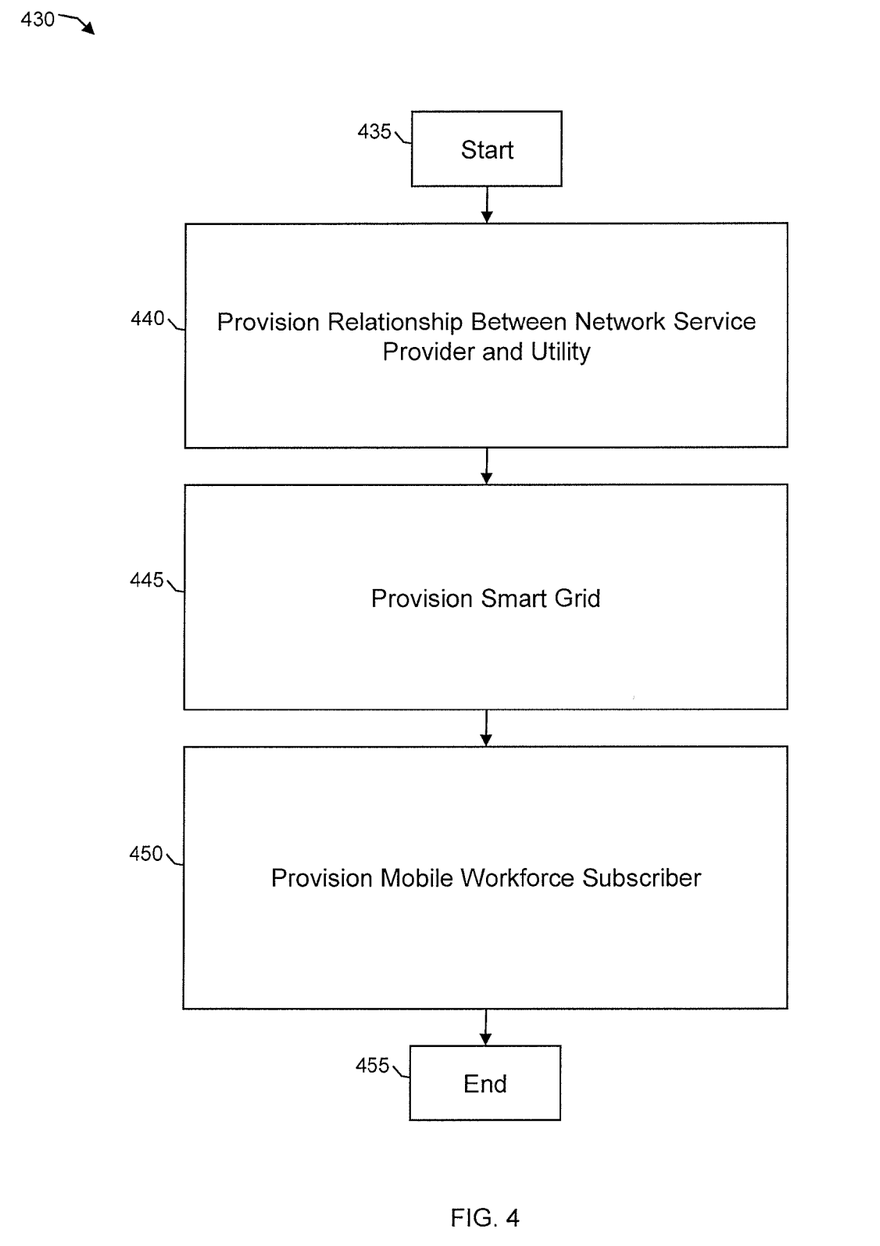
FIG. 4 shows an exemplary flow for provisioning the smart grid in accordance with aspects of the invention.
Figure 5:
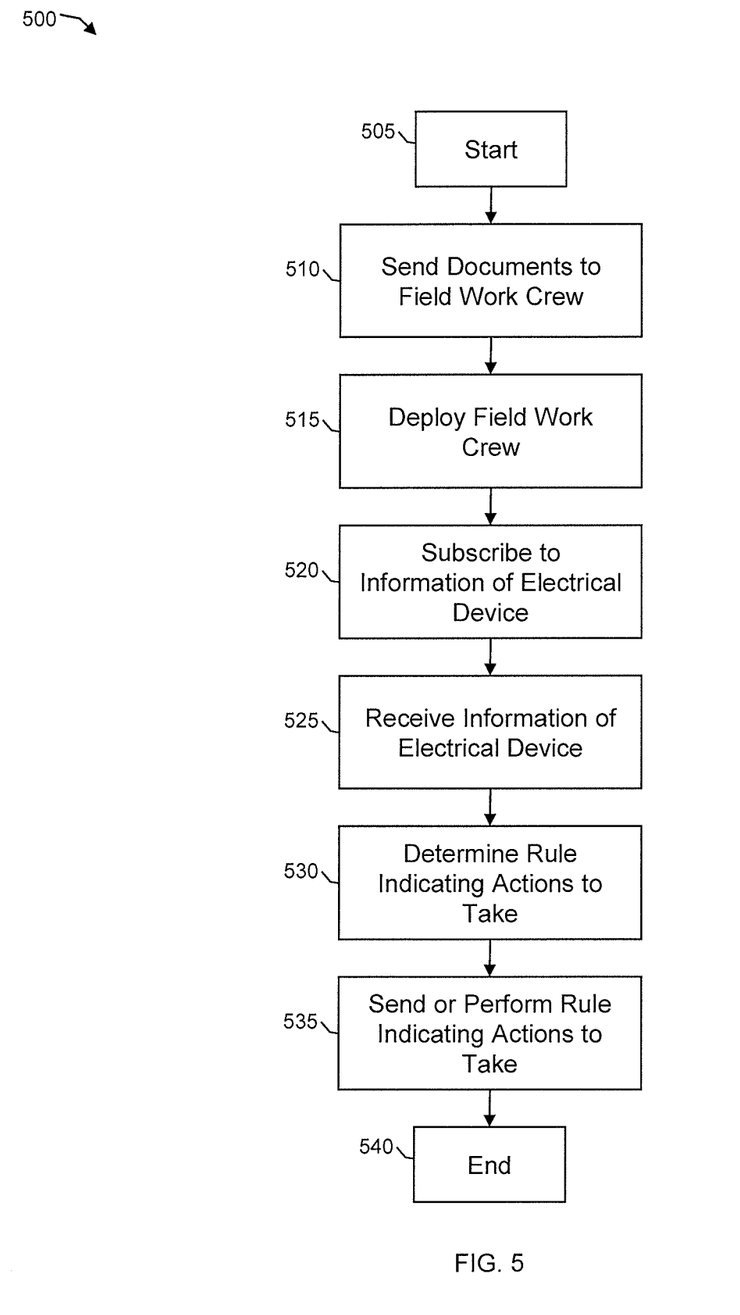
FIG. 5 shows another exemplary flow for enabling work force management of the smart grid in accordance with aspects of the invention.

FIGS. 3-5 show exemplary flows for performing aspects of the present invention. The steps of FIG. 3-5 may be implemented in the environment of FIGS. 1 and/or 2, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1 and/or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flow for a process 300 of enabling work force management of the smart grid in accordance with aspects of the present invention. The process 300 involves three players: a user and transport plane 305, a control plane 310, and a service plane 315. The user and transport plane 305 includes the subscriber device 210 and the electrical device(s) 205, e.g. the subscriber device 210 and the electrical device 205 in FIGS. 1 and/or 2. The control plane 310 includes the registrar 230 and a presence cluster 320, e.g., the S-CSCF/SIP registrar 230 and the presence cluster 235 and/or 255 in FIG. 2. The service plane 315 includes a watcher 325 and the rules database 240, e.g., one of the watchers 265, 270, 275, and/or the utility manager 105 and the rules database 240 in FIG. 2.

At step S330, the process starts, and the subscriber device 210 provisions a set of rules associated with specific event categories and event lists regarding the electrical device 205. These categories and lists are stored in the rules database 240. The event categories and lists may include actions to take, as and when the events occur. At step S335, the electrical device 205 sends a SIP register message via a gateway router (e.g., the load balancing layer 215) to the registrar 230, to register the electrical device 205 and/or the gateway router in the IMS/SIP network.

At step S340, the registrar 230 registers the electrical device 205 and/or the gateway router in the IMS/SIP network using SIP semantics, such as Initial Filter Criteria (iFC). At step S345, the registrar 230 sends a SIP acknowledgment message to the electrical device 205 that indicates that the electrical device 205 has been registered successfully. At step S350, the watcher 325 sends a SIP subscribe to the presence cluster 320 to subscribe to updates in presence information in the presence cluster 320, such as notifications of critical events or status information at the electrical device 205. At step S355, the presence cluster 320 sends a SIP acknowledgment message to the watcher 325 that indicates that the watcher 325 has subscribed successfully with the presence cluster 320.

At step S360, the subscriber device 210 sends a SIP subscribe to the presence cluster 320 to subscribe to updates in presence information in the presence cluster 320, such as notifications of critical events or status information at the electrical device 205. At step S365, the presence cluster 320 sends a SIP acknowledgment message to the subscriber device 210 that indicates that the subscriber device 210 has subscribed successfully with the presence cluster 320. At step S370, the electrical device 205 records or observes a critical event or status information at the electrical device (e.g., an electrical fault). At step S375, the electrical device 205 sends a SIP notify message including presence information of the critical event and the electrical device 205 to the presence cluster 320.

At step S380, the presence cluster 320 processes the SIP notify message, including building or updating a presence document including the presence information and storing the presence document in a database, e.g., the subscriber/usage database 260. At step S385, the presence cluster 320 sends a SIP acknowledgement message to the electrical device 205 that indicates that the presence information has been received and processed. At step S390, the presence cluster 320 cycles through its watcher list and sends a SIP publish message or notifications to the watcher 325 that includes the updated presence information. At step S395, the watcher 325 sends a SIP acknowledgement message to the presence cluster 320 that indicates that the presence information has been received.

At step S400, the presence cluster 320 cycles through its watcher list and sends a SIP publish message or notifications to the subscriber device 210 that includes the updated presence information. At step S405, the subscriber device 210 sends a SIP acknowledgement message to the presence cluster 320 that indicates that the presence information has been received. At step S410, the watcher 325 requests a rule from the rules database 240 based on the notification of the critical event or status information at the electrical device 205. At step S415, the rules database 240 processes the request, specifically, determining the actions to take based on the critical event or status information. At step S420, the rules database 240 responds with the rule indicating the actions to take in response to the critical event or status information. At step S425, the watcher 325 may send to the electrical device 205 the rule indicating the actions to take, or may perform (initiate) actions necessary to make changes in the electrical device 205, such as remotely control the electrical device 205. At step S425, the process ends.

FIG. 4 shows an exemplary flow for a process 430 of provisioning the smart grid in accordance with aspects of the invention. At step 435, the process starts. At step 440, a relationship and connection between a network service provider (e.g., a cellular network service) and a utility provider ("utility") is provisioned. Specifically, a carrier connection agreement and a settlement (business) agreement between the network service provider and the utility are finalized and agreed upon. Then, the network service provider and the utility provider establish and test their network domain connectivity, such as peering between presence clusters in their respective domains. The providers also finalize authorization rules of their network domains, or rules on how to connect to their respective network domains, e.g., telecommunication rules and/or SIP registration semantics.

At step 445, a smart grid of the utility is provisioned. Particularly, at least one electrical device is installed in the smart grid and connected to network domains of the utility and the network service provider. A subscriber (e.g., a field crew) profile is setup in the network domains and in a rules database. The utility then tests the connectivity of the electrical device with the smart grid and the network domains. The utility then notifies the subscriber of the connection of the electrical device to the smart grid.

At step 450, a subscriber is provisioned to use the smart grid and the network of the invention. Specifically, the subscriber subscribes to a device information (e.g., status information of the electrical device) and command control service operated by the utility and/or network service provider. The subscriber then configures his or her network device (e.g., a mobile device) for use in the special service. The subscriber may test the configured network device using the service. Through the network device, the subscriber configures critical electrical events at the electrical device and other energy control rules, by communicating with a rules database in the network domain of the utility. The subscriber may also communicate with the presence clusters at the network domains of the utility and/or the network service provider to receive and possibly react to notifications of the critical events at the electrical device. At step 455, the process ends.

FIG. 5 depicts another exemplary flow for a process 500 of enabling work force management of the smart grid in accordance with aspects of the present invention. In embodiments, the process 500 may be performed by the utility manager 105 in FIGS. 1 and/or 2. At step 505, the process 500 starts. At step 510, the utility manager sends documents (e.g., a switching plan document and a safety document) pertaining to an electrical device that needs to be reconfigured to a field crew. At step 515, the utility manager deploys the field crew to a location of the electrical device.

At step 520, the utility manager subscribes to notifications of critical events or status information at the electrical device, such as through sending a SIP subscribe message to a presence cluster. At step 525, the utility manager receives the notifications of the critical events or status information at the electric device, such as via receiving a SIP publish message. At step 530, the utility manager determines a rule from a rules database (e.g., the rules database 240 in FIG. 2) based on the notification of the critical event or status information at the electrical device. At step 535, the utility manager either sends to the electrical device the rule indicating the actions to take, or performs (initiates) actions necessary to make changes in the electrical device, such as remotely control the electrical device. At step 540, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method, comprising:
receiving, by a computer processor in a presence cluster, a first Session Initiation Protocol (SIP) message from a monitoring device of an electrical component on an electrical grid that is registered with a SIP registrar corresponding to the presence cluster, the first SIP message comprising a status of the electrical component, a type of the electrical component and specifications of the electrical component, wherein the electrical component is one of a fuse, transformer, circuit breaker, capacitor, voltage regulator, compensator, relay, feeder, switch, and protection device located at an electrical substation or power station and monitored by a utility provider;
determining, by the computer processor, that a utility manager of the utility provider is a subscriber of the presence cluster for notifications of status information sent to the presence cluster by the electrical component;
notifying the utility manager of the state of the electrical component by sending a second SIP message;
sending by the utility manager documents pertaining to the electrical component to a field crew of the utility provider; and
deploying the field crew to a location of the electrical component.

2. The method of claim 1, further comprising:
determining a control command comprising at least one action to take in response to the state of the electrical component; and
sending the control command to the electrical component, in a third SIP message.

3. The method of claim 2, wherein the electrical component configures itself based on the control command by performing the at least one action to take in response to the state of the electrical component.

4. The method of claim 1, further comprising receiving a fourth SIP message from the utility manager requesting to subscribe to updates of the state of the electrical component.

5. The method of claim 1, further comprising:
at least one of building and updating a presence document comprising the state of the electrical component and information regarding the utility manager; and
storing the presence document.

6. The method of claim 1, wherein the state of the electrical component comprises an indication that the electrical component is overheating.

7. The method of claim 1, wherein the first SIP message is received when an electrical event is recorded at the electrical component.

8. The method of claim 1, further comprising sending a fifth SIP message to the field crew, the fifth SIP message comprising at least one of:
an action to perform on the electrical component in response to the state of the electrical component;
a safety alert associated with the electrical component;
a location of the electrical component; and
a schematic of the electrical component.

9. The method of claim 1, wherein the field crew is located in a network domain of the utility provider.

10. The method of claim 1, wherein a service provider at least one of creates, maintains, deploys and supports a computer infrastructure operable to perform the steps of claim 1.

11. The method of claim 1, wherein the steps of claim 1 are provided by the service provider on a subscription, advertising, and/or fee basis.

12. A system implemented in hardware, comprising:
a domain server operable to:
  register at least one electrical component on an electrical grid in an IP Multimedia Subsystem (IMS)/Session Initiation Protocol (SIP) network in response to receiving a SIP register message from the at least one electrical component, wherein the electrical component is one of a fuse, transformer, circuit breaker, capacitor, voltage regulator, compensator, relay, feeder, switch, and protection device located at an electrical substation or power station and monitored by a utility provider;
  subscribe a plurality of client devices to a presence cluster in response to receiving a SIP subscribe message from the plurality of client devices, wherein:
    the subscribing subscribes the plurality of client devices to notifications of critical events or status information at the at least one electrical component,
    the plurality of client devices include a client device of a manager of the utility provider, and
    the plurality of client devices include a client device of a field crew deployed to the at least one electrical component by the utility provider;
  receive, via the presence cluster, a SIP notify message from the at least one electrical component, the SIP notify message comprising a monitored state of the at least one electrical component on the electrical grid;
  determine that the plurality of client devices are subscribed to the presence cluster;
  send SIP publish messages to the client device of the manager and the client device of the field crew, the SIP publish messages including presence information comprising the monitored state of the at least one electrical component;
  send a switching plan document pertaining to the electrical component to the field crew, wherein the switching plan document includes specifications, a location, and a schematic of the electrical component;
  determine a control command comprising at least one action to take in response to the monitored state of the at least one electrical component;
  send the control command to the at least one electrical component,
  wherein:
    the at least one electrical component configures itself based on the control command by performing the at least one action to take in response to the monitored state, and
    the SIP register message, the SIP subscribe message, the SIP notify message, and the SIP publish message are SIP signaling protocol messages; and
  send rules set by the field crew regarding control of the electrical component and indicating one of: (1) the field crew has allowed the utility provider to control the electrical component; (2) the field crew has programmed to control the electrical component for only a specific period of time; and (3) the field crew has programmed the electrical component to be in their complete control.

13. The system of claim 12, further comprising an Extensible Markup Language (XML) Data Management Server (XDMS) operable to:
  at least one of build and update a presence document comprising the monitored state of the at least one electrical component and information regarding the at least one client device of the field crew; and
  store the presence document.

14. The system of claim 12, wherein the monitored state of the at least one electrical component comprises at least one of:
  an indication whether the at least one electrical component is on or off;
  an indication that the at least one electrical component is malfunctioning or is inoperable;
  an indication that the at least one electrical component requires maintenance; and
  an indication that the at least one electrical component is performing within specified operational limits.

15. The system of claim 12, wherein the SIP notify message is received when an electrical event is recorded at the at least one electrical component.

16. The system of claim 12, wherein the at least one client device of the field crew is operable to send the control command comprising the at least one action to take in response to the monitored state, to the at least one electrical component.

17. The system of claim 12, wherein the domain server is operable to send a SIP message to the at least one client device of the field crew, the SIP message comprising at least one of:
  an action to perform on the at least one electrical component in response to the state of the at least one electrical component;
  a safety alert associated with the at least one electrical component;
  a location of the at least one electrical component; and
  a schematic of the at least one electrical component.

18. The system of claim 12, wherein the domain server is located in a network domain of at least one of the utility provider and a network service provider.

19. The system of claim 12, wherein the at least one client device of the field crew is located in a network domain of at least one of a utility provider, a network service provider, and a third-party location.

20. A computer program product comprising a computer readable hardware storage device and program instructions stored on the computer readable hardware storage device, the program instructions comprising:
  program instructions to receive a first Session Initiation Protocol (SIP) message from a monitoring device of an electrical component on an electrical grid that is registered with a SIP registrar corresponding to a presence cluster, the message comprising a status of the electrical component, a type of the electrical component and specifications of the electrical component;
  program instructions to determine that a utility manager is a subscriber of the presence cluster for status information sent to the presence cluster by the one electrical component;
  program instructions to notify the utility manager of the state of the electrical component by sending a second SIP message
  program instructions to send a switching plan document pertaining to the electrical component to a field crew, wherein the switching plan document includes specifications, a location, and a schematic of the electrical component; and
  program instructions to deploy the field crew to the location of the electrical component.

21. The computer program product of claim 20, further comprising:
program instructions to determine a control command comprising at least one action to take in response to the state of the electrical component; and
program instructions to send the control command to the electrical component,
wherein the electrical component configures itself based on the control command by performing the at least one action to take in response to the state of the electrical component.

22. A method for work force management of an electrical grid, comprising:
sending, by a computer processor, a register message to a Serving Call Session Control Function (S-CSCF)/Session Initiation Protocol (SIP) registrar to register in a IP Multimedia Subsystem (IMS)/SIP network;
recording, by the computer processor, an electrical event at a location on the electrical grid specified by a field crew in possession of a subscriber device deployed to the location by a utility manager of a utility provider;
sending, by the computer processor, a SIP notify message to a presence server corresponding to the S-CSCF/SIP registrar, the SIP notify message comprising presence information of the electrical event at the location specified by the field crew;
receiving, by the computer processor, a control command from the utility manager, which is subscribed to the presence server for notifications of events published to the presence cluster by an electrical component, the control command comprising at least one action to take in response to the electrical event;
receiving, by the computer processor, rules from the subscriber device possessed by the field crew, wherein the rules are set by the field crew regarding control of the electrical component and indicate one of: (1) the field crew has allowed the utility provider to control the electrical component; (2) the field crew has programmed to control the electrical component for only a specific period of time; and (3) the field crew has programmed the electrical component to be in their complete control; and
performing, by the computer processor, the at least one action to take in response to the electrical event.

23. A computer system for work force management on an electrical grid, the system comprising:
one or more computer processors;
a computer readable hardware storage device;
program instructions stored on the computer readable hardware storage device for execution by the one or more computer processors, the program instructions comprising:
program instructions to receive a SIP register message requesting to register at least one electrical component with a Serving Call Session Control Function (S-CSCF)/Session Initiation Protocol (SIP) registrar of an IP Multimedia Subsystem (IMS)/SIP network, wherein the electrical component is one of a fuse, transformer, circuit breaker, capacitor, voltage regulator, compensator, relay, feeder, switch, and protection device located at an electrical substation or power station and monitored by a utility provider;
program instructions to register the at least one electrical component with the S-CSCF/SIP registrar;
program instructions to receive SIP subscribe messages from a plurality of client devices, wherein:
the SIP subscribe messages request to subscribe to updates of the monitored state of the at least one electrical component for management of the at least one electrical component,
the plurality of client devices include a client device of a manager of the utility provider, and
the plurality of client devices include a client device of a field crew in possession of a subscriber device deployed to the at least one electrical component by the utility;
program instructions to subscribe the plurality of client devices to a presence cluster corresponding to the S-CSCF/SIP registrar;
program instructions to receive a SIP notify message from the at least one electrical component, the SIP notify message comprising a monitored state of at least one electrical component on the electrical grid;
program instructions to determine that the at least one client device is subscribed to the presence cluster;
program instructions to send a SIP publish message to the client device of the manager and the client device of a field crew for management of the at least one electrical component, the SIP publish message comprising the monitored state of the at least one electrical component;
program instructions to determine a control command comprising at least one action to take in response to the monitored state of the at least one electrical component; program instructions to send the control command to the at least one electrical component;
program instructions to send a switching plan document pertaining to the electrical component to the field crew, the switching plan document includes specifications, a location, and a schematic of the electrical component; and
program instructions to control, by the utility manager and the subscriber device, the electrical component of the utility provider, wherein the field crew possessing the subscriber device sets rules regarding control of the electrical component indicating one of: (1) the field crew has allowed the utility provider to control the electrical component; (2) the field crew has programmed to control the electrical component for only a specific period of time; and (3) the field crew has programmed the electrical component to be in their complete control;
wherein the monitored state of the at least one electrical component comprises:
an indication whether the at least one electrical component is on or off;
an indication that the at least one electrical component is malfunctioning or is inoperable;
an indication that the at least one electrical component requires maintenance; and
an indication that the at least one electrical component is performing within specified operational limits, and
wherein the SIP register message, the SIP subscribe message, the SIP notify message, and the SIP publish message are SIP signaling protocol messages.

24. The method of claim 1, wherein:
the state of the electrical component comprises presence information; and
the method further comprises:
subscribing a subscriber device of the field crew to the presence cluster in response to receiving a SIP subscribe message from the subscriber device;

subscribing a watcher device of the utility manager to the presence cluster in response to receiving a SIP subscribe message from the watcher device;

sending a SIP acknowledgement message to the electrical component, the SIP acknowledgement message indicating that the presence information has been received and processed by the presence cluster;

building a presence document including the presence information;

determining that the subscriber device is subscribed to the presence server;

sending a SIP publish message to the subscriber device including the presence information; and forwarding, via the presence cluster, a control message from the subscriber device to the electrical device, the control message including a control command from the field crew for the electrical device.

\* \* \* \* \*